N. LEBLOND.
COMBINATION BEAM LEVEL AND INCLINATION INDICATOR OR INCLINOMETER.
APPLICATION FILED MAR. 24, 1917.
1,257,256.
Patented Feb. 19, 1918.
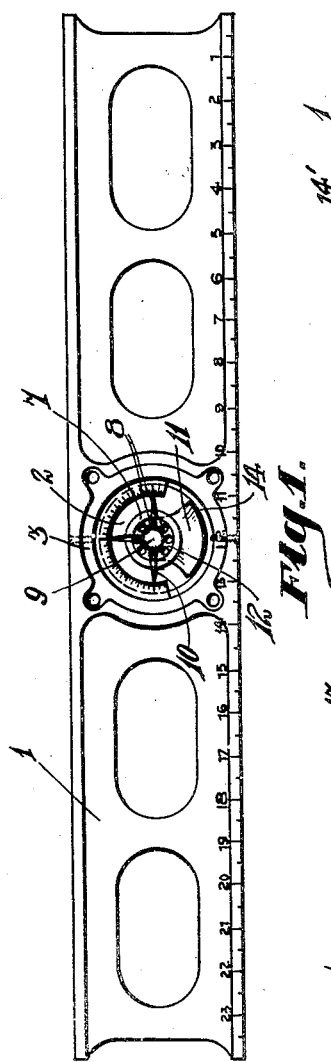
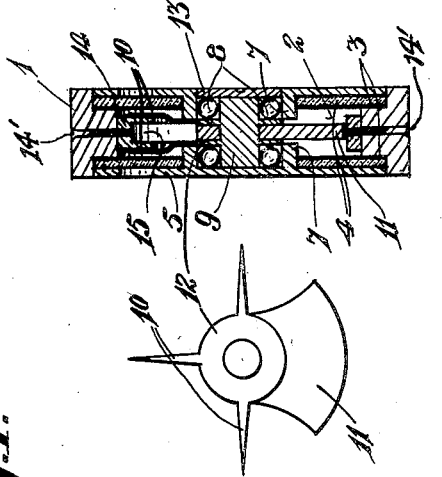
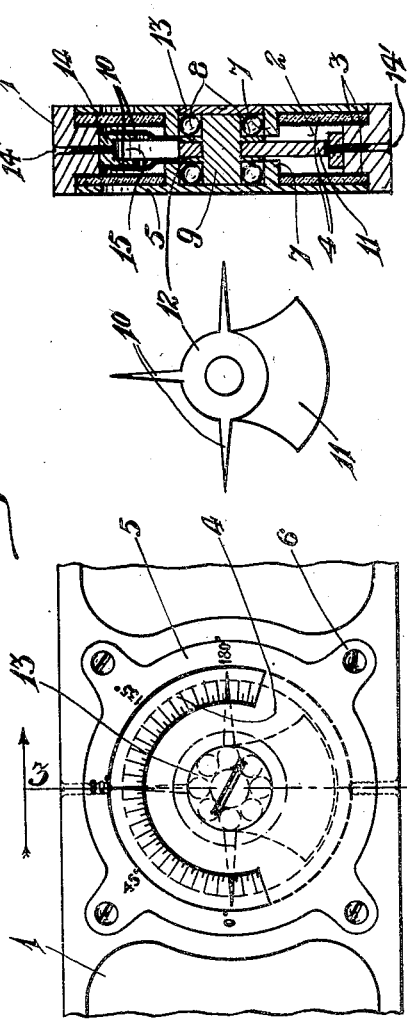
NAPOLEON LEBLOND
INVENTOR
Attorneys

UNITED STATES PATENT OFFICE.

NAPOLEON LEBLOND, OF QUEBEC, QUEBEC, CANADA.

COMBINATION BEAM-LEVEL AND INCLINATION-INDICATOR OR INCLINOMETER.

1,257,256.

Specification of Letters Patent.

Patented Feb. 19, 1918.

Application filed March 24, 1917. Serial No. 157,252.

*To all whom it may concern:*

Be it known that I, NAPOLEON LEBLOND, a subject of the King of Great Britain, residing at Quebec, Province of Quebec, Canada, have invented certain new and useful Improvements in Combination Beam-Levels and Inclination-Indicators or Inclinometers; and I do hereby declare that the following is a full, clear, and exact description of the invention, such as will enable others skilled in the art to which it appertains to make and use the same.

The invention to be hereinafter described relates to a combination beam level and inclination indicator, or inclinometer.

In order to more clearly disclose the construction, operation, and use of the invention reference should be had to the accompanying drawings forming part of the present application. Throughout the several figures of the drawings like reference characters designate the same parts.

In the drawings:—

Figure 1 is a side elevation of the invention;

Fig. 2 is an enlarged side elevation of the indicator case;

Fig. 3 is a vertical cross section on the line 3—3 of Fig. 2; and,

Fig. 4 is an enlarged side elevation of the pointer.

The main objects of the invention are to provide a simple, compact, efficient, economical, and durable instrument by which the exact degree of incline may be accurately determined and immediately indicated.

Referring to the drawings in detail, 1 indicates a level beam of usual and well known construction, preferably graduated so that it may be used as a measure. At a point in its length, preferably, about its center, a circular opening 2 is made. The beam is countersunk on each side of this opening and concentrically therewith to provide annular shoulders 3. Seated on these shoulders are annular glass plates 4 the upper halves of which have circumferentially arranged graduations ranging from 0° to 180°, to indicate the degree of inclination. Metal clamping plates 5 provided with ears 6 for the passage of fastening screws are used to hold these glasses on their seats. Each metal plate is provided with an arcuate opening coextensive with the graduated part of the adjacent glass plate, as shown. Each clamping plate is provided with a centrally arranged circular wall or flange 7 extending perpendicularly inward from its face, as in Fig. 3. Within each of these circular walls are arranged a plurality of ball or other anti-friction bearings 8. On these bearings are revolubly supported the opposite ends of the short axle or axis 9 of a pointer or index needle 10 which is provided with a pendulum weight 11 so disposed that it will keep the central finger of the pointer normally at the 90° mark on the index. A centrally disposed web 12 on the axle acts as a ball retainer to keep the balls within their respective walls, as will be clear on reference to Fig. 3. One of the plates 5 is provided with a central screw threaded opening coextensive with the space within its circular wall. A small screw threaded disk 13 serves as a closure for this opening, for a purpose to be later disclosed.

Preferably the needles of the indicator are made in pairs extending from the web 12 and offset outwardly therefrom, so that a reading may be had from either side of the instrument, as will be clear on reference to Fig. 3. To prevent lateral movement of the index and possible consequent binding or irregular operation, an arcuate guide block 14 has been provided and is secured to the inner wall of the circular opening by means of the set screws 14' in such position that its vertical walls will act as a guide for the needles, allowing them no lateral movement. This block is provided with a channel or groove 15 to allow passage of the pendulum 11, so that the index pointer may be completely rotated without obstruction, if desired.

In assembling the instrument, one glass plate is seated on its shoulder and its clamping plate secured in position. This clamping plate should be the one which has no central opening. The balls are then placed within the wall 7, and the index pointer is placed in position, with one end of its axle surrounded by the balls and its needles on opposite sides of the guide block. Then the other glass plate is seated and its clamping plate is secured in position. Next, the balls 9 are placed within wall 7 of this plate and surrounding the remaining axle end. Then the disk 13 is screwed home and the instrument is complete and ready for use.

It is thought that the construction, operation, and use of the invention will be clear from the preceding detailed description.

Changes may be made in the construction, arrangement, and disposition of the several parts of the invention without in any way departing from the field and scope of the same, and it is meant to include all such within this application wherein only a preferred form has been disclosed.

Having thus fully described my invention, what I claim as new and desire to secure by Letters Patent is:

An instrument of the character described comprising, a beam provided with a circular opening having concentric shoulders at its opposite ends, glass disks having a central opening and adapted to close said opposite ends and to rest within said shoulders, said glass disks each having graduations thereon, clamping plates adapted to rest within said shoulders outside of said disks and to be secured to said beam, inwardly projecting flanges carried by said clamping plates and projecting through the openings in said disks, a shaft journaled within said flanges, a web mounted upon said shaft, a plurality of pointers extending from said web, a pendulum weight depending from said web, a guide block projecting within said opening, said pointers adapted to project on each side of said guide block, said guide block having a groove therein through which the pendulum weight may pass, said clamping plates having semicircular openings therein through which the graduations upon the glass disks are exposed to view substantially as and for the purpose specified.

In witness whereof I have hereunto set my hand.

NAPOLEON LEBLOND.